United States Patent [19]

Hartmann

[11] Patent Number: 4,649,274

[45] Date of Patent: Mar. 10, 1987

[54] TEMPERATURE STABLE BORESIGHT MODULE

[75] Inventor: Rudolf Hartmann, Winter Park, Fla.

[73] Assignee: The United States of America as represented by the Secretary of the Army, Washington, D.C.

[21] Appl. No.: 769,457

[22] Filed: Aug. 22, 1985

[51] Int. Cl.$^4$ ...................... G02B 23/04; G01M 11/00
[52] U.S. Cl. ................................. 250/341; 250/252.1; 250/330; 250/467.1
[58] Field of Search ................ 356/153, 138; 250/334, 250/332, 330, 467.1, 252.1, 341; 350/574, 576, 173, 172, 171, 602

[56] References Cited

U.S. PATENT DOCUMENTS

| | | | |
|---|---|---|---|
| 3,518,005 | 6/1970 | Weber | 356/138 |
| 3,966,328 | 6/1976 | Wiklund | 356/138 |
| 4,022,533 | 5/1977 | Firester | 356/153 |
| 4,139,769 | 2/1979 | McCrum et al. | 250/341 |
| 4,422,758 | 12/1983 | Godfrey et al. | 356/152 |

FOREIGN PATENT DOCUMENTS 160334 11/1985 European Pat. Off. ............ 356/138

OTHER PUBLICATIONS

Max Amon, Rudolph Hartman, Edward Poppliers, "Target Acquisition and Designation System/Pilots Night Vision Sight TADS/PNVS", 1981 Annual Meeting of the Optical Society of America, Kissimmee, Fla. (Oct. 1981).
Target Acquisition Designation Sight/Pilot Night Vision Sensor, vol. P-13, Substantiating Technical Data, Book 1, TADS Technical Description and Performance Data, Part 2, Martin Marietta Aerospace OR 15,801P13B1P2 (Dec. 1979).

Primary Examiner—Janice A. Howell
Assistant Examiner—Constantine Hannaher
Attorney, Agent, or Firm—Norman L. Wilson, Jr.

[57] ABSTRACT

Laser guided weapons delivery systems are now well known. Such systems, termed laser designator/sighting devices, are optical devices. One of the major potential sources of error in optical devices is misalignment of optical elements, particularly in helicopters and tanks where operating environments are quite severe. Alignment is maintained by boresighting, using optical instruments, called boresighting modules, which can be coupled optically with the misaligned optical device. Since these modules usually include prisms, beam dividers, mirrors and lenses, vibrations and other mechanical problems have been sources of error. While vibrational and weight load errors have been considered, the problem of errors due to thermal device has not been solved. The problem is solved herein by a boresight device incorporating a zero expansion, glass ceramic, optical transfer tube.

7 Claims, 6 Drawing Figures

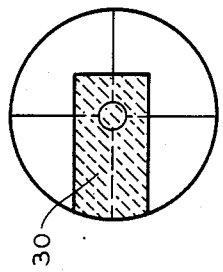
FIG. 4
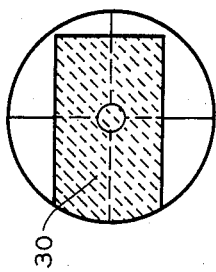
FIG. 5
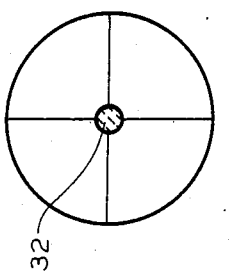
FIG. 6
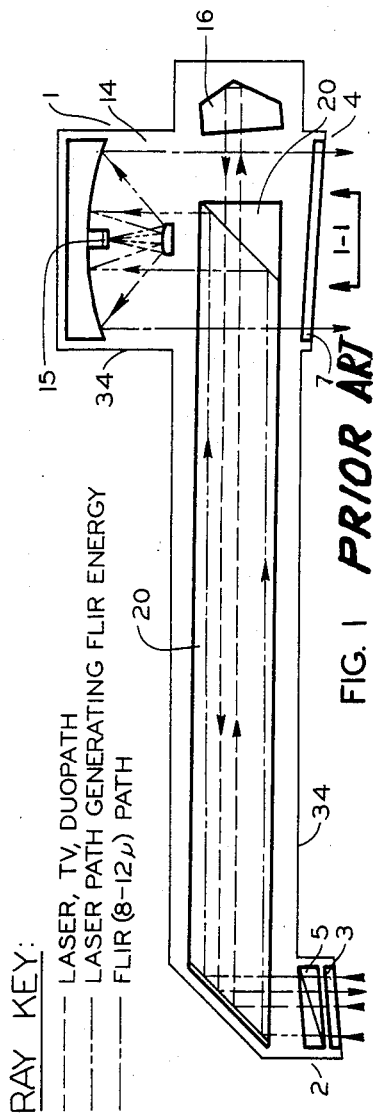
FIG. 1 *PRIOR ART*
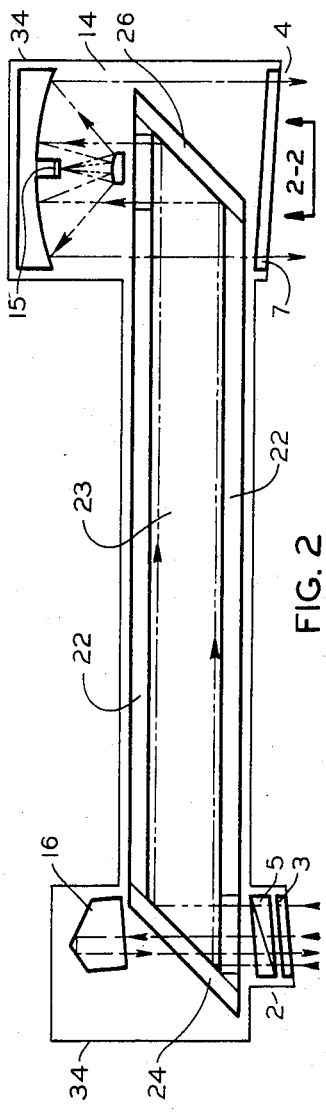
FIG. 2
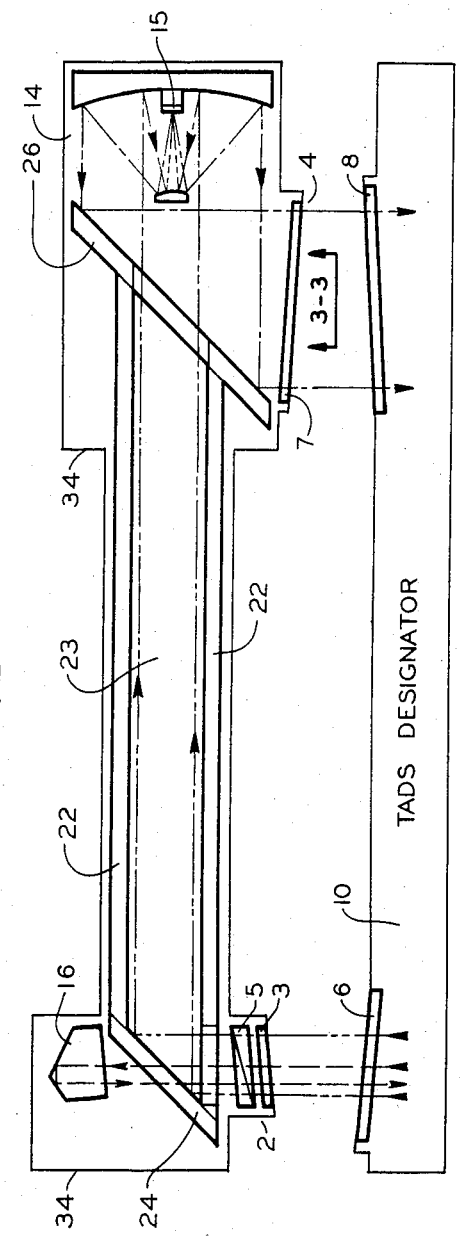
FIG. 3

TEMPERATURE STABLE BORESIGHT MODULE

This invention relates to boresights for optical instruments, particularly to optical systems used for military purposes, known as target designator sights. In a specific aspect the invention pertains to more durable, temperature-stable boresighting modules for use in helicopters and tanks.

Laser guided weapons delivery systems are now well known. Such systems, termed laser designator/sighting devices, are optical devices which usually include a laser, and a near-infrared TV camera, in combination with an autotracking system, a direct view optical telescope system, and a forward looking infrared (FLIR) nighttime imaging/tracking system.

One of the major potential sources of error in optical devices is misalignment of optical elements, particularly in helicopters and tanks where operating environments are quite severe. Not only must the laser system designating a target be in alignment with the sighting system being used to aim at the target, but the day and night sighting systems remain aligned. This alignment is calibrated by boresighting using optical instruments, called boresighting modules, optically coupled with the particular designator sighting and tracking system. Boresighting devices are the subject of such patents as U.S. Pat. No. 3,518,005, U.S. Pat. No. 3,966,328, U.S. Pat. No. 4,022,533 and U.S. Pat. No. 4,422,758. These modules usually include prisms, beam dividers, mirrors and lenses.

The boresighting of the TV and direct view optics reticles in laser designator/sighting systems is straightforward because they share the same aperture. Normal optical glasses can be used to cover the whole spectral range of 0.45 to 1.064 micrometers. The laser energy is retroreflected back into the TV camera with sufficient laser energy being returned to the TV camera to permit boresighting of the TV reticle to the laser line of sight. The direct view optics reticle is illuminated with a light source and projected out to the same aperture of the retroreflector. Again, there is sufficient retroreflected energy for the day view optics reticle to be seen in the TV camera. The day view optics portion is then boresighted to the TV line of sight.

The FLIR presents a special problem since it is only sensitive to thermal radiation and cannot sense the shorter wavelength laser energy. Consequently the FLIR reticle is indirectly boresighted to the TV reticle. A pinhole is illuminated with a broadband source and projected into the TV and FLIR apertures simultaneously. Light waves are transmitted between the FLIR and TV apertures. The TV tracker is used to stabilize the system by tracking the pinhole while the FLIR reticle is boresighted.

Due to the sensitivities of optical instruments to vibrations, especially sighting and boresighting systems used in helicopters, such vibrations are a matter of concern. Thus, vibration of the bulkhead mounted boresighting module introduces a boresighting error due to the finite FLIR sample rate. To decrease its sensitivity to in-flight vibrations a one-piece, solid rhomboid transfer prism has been adopted. It is used in the boresighting module to bridge the gap between the FLIR and TV apertures. This transfer prism is held in place by a specially designed kinematic mount. The transfer prism is shown in the description of the boresighting module in a proposal submitted by Martin Marietta Corporation to the U.S. Army, St. Louis, for Production of the Target Acquisition Designation Sight/Pilot Night Vision Sensor (TADS/PNVS) in response to solicitation number DAAK50-79-R-0008. The publication is identified as Volume P-13 Substantiating Technical Data (U) Book 1, TADS Technical Description and Performance Data, Part 2 (U). The transfer prism is also shown in the paper entitled "Target Acquisition and Designation System/Pilot Night Vision Sight TADS/PNVS," by Max Amon, Rudolf Hartmann and Edward Poppeliers presented at the October, 1981, meeting of the Optical Society of America in Kissimmee, Fla.

As will be ascertained from these articles, most boresighting module components provide greatly relaxed angular tolerances, achieved through the use of Risley prisms. Nevertheless, the accuracy problem is not completely solved. While vibrational and weight load errors have been considered, the problem of thermal changes leading to vibrations in results has gone unsolved. Boresighting errors resulting from thermal gradients within the module have been analyzed with the aid of a three-dimensional thermal model and optical component displacements and rotations have been found to be an existing problem. A disadvantage of the transfer prism is its response to thermal changes. This invention provides a solution to the thermal problem.

SUMMARY OF THE INVENTION

Optical boresight calibrating devices contemplated herein are those rendering parallel two lines-of-sight in each of two spectral regions. One line-of-sight is generated by retroreflection of radiation entering the device. The other line-of-sight is generated by focusing a portion of the entering radiation on a transducer material in a collimator. This converts the radiation to a different spectral region and re-emits it as a beam parallel to the retroreflected line-of-sight. The invention herein provides means maintaining this parallelism despite thermal changes. A zero expansion glass ceramic polygonal spacer, a dichroic beam splitter, a corner cube prism, and a reflective collimator are employed in combination with optical temperature nullifying means securing them to each other.

DETAILED DESCRIPTION OF THE INVENTION

Most boresight components are in fixed relationships relative to each other, with no adjustment provisions. The boresight device is adjusted to zero outpointing error during fabrication, being fabricated as a sealed system. The only sources of error, then, are vibrational and thermal gradients. The devices are designed to be inherently insensitive to in-flight vibrations. It has not been possible heretofore however to design for inherent thermal insensitivity. The boresighting device herein is so designed. The thermally sensitive transfer prism has been eliminated, and the number of optical components has been minimized.

As indicated, this invention contemplates a zero-expansion glass ceramic polygonal spacer. The spacer is equal in length to the separation between apertures to be boresighted and is provided with 45 degree parallel end faces, and a longitudinal bore therein forming an optical path therethrough from end face to end face. A dichroic beamsplitter plate is secured by optical temperature nullifying means to the first end face at a 45 degree angle to the entering radiation so that it reflects entering radiation into the polygonal spacer. A corner cube prism is placed to receive a transmitted portion of the incoming radiation from the beamsplitter plate for retroreflection, as the remaining portion of incoming radiation is reflected off the beamsplitter plate through the bore in the polygonal spacer. A reflective collimator is positioned to focus onto a wavelength converting material the portion of incoming radiation thus reflected so that re-emitted, excited radiation fills the entire aperture of the collimator. By optical temperature nullifying means an opaque, annular, elliptical front surface mirror is secured to the second parallel face of the polygonal spacer so that it projects a beam of the excited radiation to the FLIR system parallel to the retroreflected line-of-sight.

The invention can perhaps best be understood from a description thereof in conjunction with the accompanying drawings in which:

FIG. 1 is a diagrammatic view of a current boresighting module;

FIG. 2 is a similar view showing the boresighting device of this invention;

FIG. 3 is another embodiment of the boresighting device of the invention; and

FIGS. 4, 5 and 6 show the obscuration improvement of the preferred embodiment of FIG. 3.

Referring first to FIG. 1, a currently used boresighting device 1 is shown which includes dayside optics 2 with its window 3 and nightside optics 4 with window 7 spaced to be opposite day and night windows 6 and 8 (FIG. 3) of an optical instrument, such as Target Acquisition Designator System (TADS) laser designator 10, housing the optical components to be aligned.

The day optics includes not only window 3, but Risley prism 5.

Since the forward looking infrared (FLIR) cannot sense laser energy a collimator 14 is employed including a refractory material 15 which glows in response to laser radiation.

Alignment of the optical instrument components is based upon the principle of retroreflection. This is accomplished by firing the laser through the boresighting module day optics 2 into a corner cube or prism 16 so that the image is retroreflected by the corner cube to be imaged by the day view optics behind day window 6. The DTV is boresighted to the laser by pointing the common DTV/laser aperture into the boresight module and firing the laser through the boresight module day optics (generally 2). The light energy is relayed through a transfer prism 20 to the corner cube 16 and hence, to the day view optics reticles.

The retroreflected beam from corner cube 16 is imaged by the DTV. The optical path from the corner cube to the DTV thru the transfer prism 20 can be seen in FIG. 1, the path being the same in all of the figures. Electronic raster positioning is used to align the electrically generated DTV reticle with the centroid of the imaged laser return. The DTV now serves as a reference for boresighting the direct view optics.

The nightside assembly is indirectly boresighted to the DTV because, as indicated, it does not respond to laser energy. Alignment is accomplished through DTV tracking of a laser-generated spot in the boresight module. The laser irradiates a refractory transducer material 15 which converts the laser energy to thermal energy which is re-emitted and can be sensed by the FLIR system. Since this conversion occurs in the focal plane of a collimator, the effect is analogous to a retroreflector, and both day and nightside spots are reflected similarly. The FLIR spot is imaged on the EO multiplexer raster, and is positioned (i.e. tracked) so that the NSA reticle is aligned to the spot image. It is to be noted that transfer prism 20, corner cubes 16, and the windows 4, 6 and 8 are slightly tilted so that their surfaces are non-reflective.

As indicated in my background of the invention, the boresighting device shown in FIG. 1 overcomes nearly all of the problems encountered except displacement due to thermal expansion of parts such as the transfer prism. The problem is overcome herein not only by the use of a hollow transfer tube, but one fabricated of a nonexpanding, or zero expansion, glass ceramic.

As is evident in FIG. 2, the polygonal transfer tube 22 replaces transfer prism 20. Preferably it is a rhomboid spacer having a longitudinal bore 23 therein forming an optical path therethrough from beamsplitter 24 to mirror 26 in abutment with each of the two end faces of the rhomboid spacer. The hollow center, or longitudinal bore 23, within rhomboid spacer 22 insures that there are no transfer medium thermal effects. Thermal effects are also obviated by the rhomboid spacer itself. Crystals of beryllium and silicon oxides have hexagonal structures, and hence high coefficients of expansion. Silicates have lower coefficients of expansion than beryllia and silica but their lattices are still not so closely packed that they do not expand. Lithium alumino silicates in the form of the glass ceramics beta-eucryptite and beta-spodomene, however have negative coefficients of expansion in the 0° to 1000° C. range. These glass ceramics have a beta-quartz structure with aluminum and lithium ions filling holes in the crystal lattice. At 720° C. LiAl$(SiO_3)_2$ is converted into its beta form $(LiAl)O_2.SiO_2$. This beta quartz structure thus is an essential constituent of zero expansion ceramics. Such ceramics are available commercially, one such product being sold as ZERODUR, a glass ceramic having both glass-like and crystalline phases. ZERODUR contains 70 to 78 percent by weight crystalline phase with the structure of a high-temperature or beta quartz.

It is to be understood that, like beta quartz, the various optical elements are also well known. Thus corner cube or tetrahedron 16 is fabricated of mirrors at right angles to one another or as a solid prism so that incident and reflected rays travel along identical paths. Risley prisms and beamsplitters, and mirrors, 5, 24 and 26, are too well known to require definition.

Another feature of this invention is that no bonding agents subject to temperature changes, are employed. As is evident in FIG. 3, the various optical elements are secured within enclosure or case 34 by kinematic means which isolate thermal effects of the housing and mounting stresses from the optical components. In addition, dichroic beamsplitter 24 and mirror 26 are optically polished and optically connected against polished spacer tube end faces, providing a molecular bond therebetween, with no changes in angular relation over a varying temperature range.

A possible drawback of the form of boresighting device exemplified in FIGS. 1 and 2 is the prism protrusion into the collimator resulting in a detrimental obscuration and an unsymmetrical aperture as a consequence of a centroid shift. This asymmetric aperture with obscuration 30 is shown in FIG. 4, as viewed through 1—1 of FIG. 1 and it is due to the placement of the collimator at a 90° angle to the transfer prism. There is also an obscuration 30 in the embodiment shown in FIG. 2, which is 2—2 shown in FIG. 5. In the preferred embodiment of the invention illustrated in FIG. 3, the collimator 14 is in alignment with transfer tube 20. The longitudinal center line of transfer tube 20 passes through the collimator center. This effects only a centric collimator obscuration 32 as shown in FIG. 6 as viewed through 3—3 of FIG. 3. Another advantage of the hollow transfer spacer over a solid prism is that the hollow spencer, having no optical surfaces which are at normal incidence to the incoming Laser beam, can be mounted parallel to the system to be boresighted while the solid prism must be tilted in both directions (azimuth and elevation) so that entrance and exit surfaces do not reflect and "blind" the system.

The operation of the boresighting device has been described in conjunction with the prior art device. Hence it remains only to show the advantage of the invention in terms of temperature stability and resulting effects on lines-of-sight changes. Optical sensitivities can be viewed in terms of optical path length differences and resultant angular errors, in microradians, of the lines-of-sight.

CALCULATION

To show this displacement as a function of temperatures the following calculation is given.

Due to severe temperature exposure of military equipment, such as the subject boresight module, small temperature gradients in optical components can have devastating effects on boresight accuracy when requirements are of microradian magnitudes. Comparing the solid transfer prism of fused silica (quartz) in the prior art with the hollow transfer zero-expansion spacer of the invention we have the following:

The optical path length between day and nightsides is 12.23 inches in both cases with a transfer aperture of 1 inch. Quartz has an expansion coefficient dL/L of $0.51 \times 10^{-6}$ and a refractive index change coefficient $dn/dt/°C$. of $10 \times 10^{-6}$. The expansion coefficient of the zero-expansion spacer of the invention is $0 \pm 0.05 \times 10^{-6}$ and the index drops out because it is air in case of the hollow tube. Calculating the line of sight (LOS) error for the quartz transfer prism yields:

$$\Delta_\theta = \frac{TL\left(\frac{dn}{dt} + (n-1)\frac{dL}{L}\right)}{CA}$$

$$\Delta_\theta = \frac{1 \times 12.23(10 \times 10^{-6} + (1.45 - 1)0.51 \times 10^{-6}}{1}$$

$$\Delta_\theta = 125 \ \mu r/°C.$$

where:
$\Delta_\theta$ = LOS error in microradians
T = Temperature difference in °C.
L = Optical path length (12.23 inches)
CA = Clear aperture (1 inch)
dn/dt = Index change ($10 \times 10^{-6}$/°C.
dL/L = Expansion coefficient ($0.56 \times 10^{-6}$)

There is no error ($\Delta_\theta$) due to temperature using the spacer tube of the invention.

Actual probative work was conducted to test the foregoing calculations. In so doing, two boresight modules (BSMs) were tested, one containing a quartz transfer prism (prior art) and the other a hollow (Zerodur) spacer (invention). A Helium-Neon (He Ne) laser beam entered the BSM dayside window, focused by the BSM collimator onto a lambertian diffuser and re-emitted through the nightside BSM window into a long focal length collimator where it impinged onto a silicon quadrant detector. Translation of this detector in the test collimator's focal plane enabled precise centroid tracking in azimuth and elevation as the exiting BSM line-of-sight (LOS) would drift due to temperature effect when the modules were placed in a temperature chamber and cycled. Results were as follows:

TABLE

| | BSM LOS Drifts in microradians | | | |
|---|---|---|---|---|
| | 60° F. Temp. Range (40°/h) | | 156° F. Temp. Range (100°/h) | |
| | Azimuth | Elevation | Azimuth | Elevation |
| Prior Art | +82 | +58 | +500 | +400 |
| (Quartz Prism) | −96 | −5 | −600 | −130 |
| Invention | +8 | +28 | +25 | +100 |
| (Zerodur Tube) | −30 | −16 | 0 | −90 |

As is evident from the table, the Zerodur BSM shows marked LOS drift reductions. Even though test equipment limitations and mechanical BSM problems prevented closer correlation with theory, the boresighting module of this invention thus shows a significant line-of-sight drift reduction due to temperature changes. It will be appreciated that the invention herein can be used in the boresighting of optical systems other than those used with laser designator ranger systems. In addition, as can be seen from the description of FIGS. 2 and 3, the invention is applicable to various boresighting devices. Such variations and ramifications are deemed to be within the scope of this invention.

What is claimed is:

1. In an optical boresight calibration device rendering parallel two lines-of-sight in each of two spectral regions, one line-of-sight being generated by retroreflection of radiation entering the device, and the other line-of-sight being generated by focusing a portion of said entering radiation on a transducer material in a collimator which converts the radiation to a different spectral region and re-emits it as a beam parallel to the retroreflected line-of-sight, means maintaining this parallelism despite thermal changes including: a zero-expansion glass ceramic polygonal spacer, equal in length to the separation between boresighting apertures and having 45 degree parallel end faces and longitudinal bore therein, forming an optical path therethrough from end face to end face; a dichroic beamsplitter plate; optical temperature nullifying means securing the beamsplitter plate to the first end face at a 45 degree angle to the entering radiation so that it transmits entering radiation into the polygonal spacer; a corner cube prism adapted to receive a portion of the incoming radiation from the beamsplitter plate for retroreflection, as the remaining portion of incoming radiation is reflected off the beamsplitter plate through the bore in the polygonal spacer; a reflective collimator adapted to focus onto a wavelength converting material the portion of incoming radiation thus reflected so that re-emitted, excited radiation fills an aperture of the collimator; an opaque, annular, elliptical mirror; optical temperature nullifying means securing the elliptical mirror to the second parallel face of the polygonal spacer so that it projects a beam of the excited radiation parallel to the retroreflected line-of-sight.

2. The device of claim 1 wherein the polygonal spacer is a rhomboid and the dichroic beamsplitter and opaque elliptical mirror are of the same material as the rhomboid spacer.

3. The device of claim 2 wherein the dichroic beamsplitter and opaque elliptical mirror are optically polished and contacted to the polished faces of the spacer to provide a molecular bond between all three parts with no changes in angular relation to one another over a temperature range.

4. The device of claim 2 wherein the optical axis of the collimator is effectively concentric with the inside bore of the rhomboid spacer so as to provide radially symmetric entrance and exit collimator apertures.

5. The device of claim 2 wherein counter-rotatable wedges, called Risley prisms, are used in the entering beam for compensation of small angular errors due to tolerances between the rhomboid spacer and the opaque mirror.

6. The device of claim 2 wherein the opaque, elliptical mirror has a clear area or an opening for the transmitted beam entering the collimator.

7. The device of claim 2 wherein all optical components are secured within an enclosure by kinematic means which isolate thermal effects and mechanical mounting stresses from said optical components.

* * * * *